Oct. 2, 1962     G. KIPER     3,056,340
MANUAL AND AUTOMATIC CAMERAS
Filed March 6, 1961     3 Sheets-Sheet 1

INVENTOR.
GERD KIPER

Oct. 2, 1962 G. KIPER 3,056,340
MANUAL AND AUTOMATIC CAMERAS
Filed March 6, 1961 3 Sheets-Sheet 3

INVENTOR.
GERD KIPER
BY
Richael S. Striker
Attorney

United States Patent Office 3,056,340
Patented Oct. 2, 1962

3,056,340
MANUAL AND AUTOMATIC CAMERAS
Gerd Kiper, Unterhaching, near Munich, Germany, assignor to Agfa Aktiengesellschaft, Leverkusen-Bayerwerk, Germany
Filed Mar. 6, 1961, Ser. No. 93,595
Claims priority, application Germany Mar. 4, 1960
16 Claims. (Cl. 95—10)

The present invention relates to cameras.

More particularly, the present invention relates to cameras which are capable of being operated either manually or automatically according to the will of the operator.

Cameras of this type generally require the operator to actuate a control button or the like for rendering the automatic structure inoperative when it is desired to operate the camera manually, and the operator may easily forget to render the automatic structure inoperative when operating the camera manually so that as a result improper operation of the camera takes place. Moreover, it is often desired to operate the camera under various conditions. For example, the camera may be operated so as to make a flash exposure or so as to make a conventional daylight exposure, for example, and under various conditions it may be desired to be able to select a particular combination of exposure time and exposure aperture where, for example, the greatest depth of field is desired or where one is photographing a rapidly moving subject. The cameras now known for accomplishing all of these results on the one hand are quite complex and on the other hand require considerable practice on the part of the operator in order to know how to operate the camera properly.

One of the objects of the present invention is to provide a camera of the above type which can be operated either manually or automatically without any possibility of improper operation and without requiring the operator to actuate any pushbuttons or the like so as to effect blocking of the automatic structure, for example.

Another object of the present invention is to provide in a camera of the above type the possibility of a selection by the operator of operation, for example, with flash illumination or with daylight illumination and manual setting of the camera, or also with purely automatic operation, if desired.

It is also an object of the present invention to provide for a camera of the above type the possibility of selecting the combination of exposure aperture and exposure time according to whether one is photographing a rapidly moving subject or whether one desires the greatest depth of field for a particular subject.

An additional object of the present invention is to provide in a camera of the above type an exceedingly simple, compact, and reliable structure which is exceedingly simple to operate, and which in fact requires mainly only actuation of one element in order to set the camera.

With the above objects in view, the invention includes, in a camera of the above type, a support means and a pair of rotary diaphragm ring means supported by the support means of rotation about the optical axis. Each of the diaphragm ring means when turning with respect to the other is capable of setting the exposure aperture, and according to the present invention there is provided a manually turnable ring means which is turnable by the operator in one direction for turning one of the diaphragm ring means and in the opposite direction for turning the other of the diaphragm ring means, and operatively connected to the manually turntable ring means is a means for influencing the exposure time. The manually turnable ring means has a rest position from which it is turned in one direction or the other in order to actuate one or the other of the diaphragm ring means, and an automatic means is provided to automatically set the camera, this automatic means being operable only when the manually turnable ring means is in its rest position. When the manually turnable ring means is out of its rest position a structure of the invention will operate, without any attention on the part of the operator, to prevent operation of the automatic means, and when the automatic means operates to set the camera, the manually turnable ring means cannot be turned by the operator, so that there is a mutual interaction whereby when the camera is manually operated it cannot operate automatically and when the camera is automatically operated it cannot operate manually.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
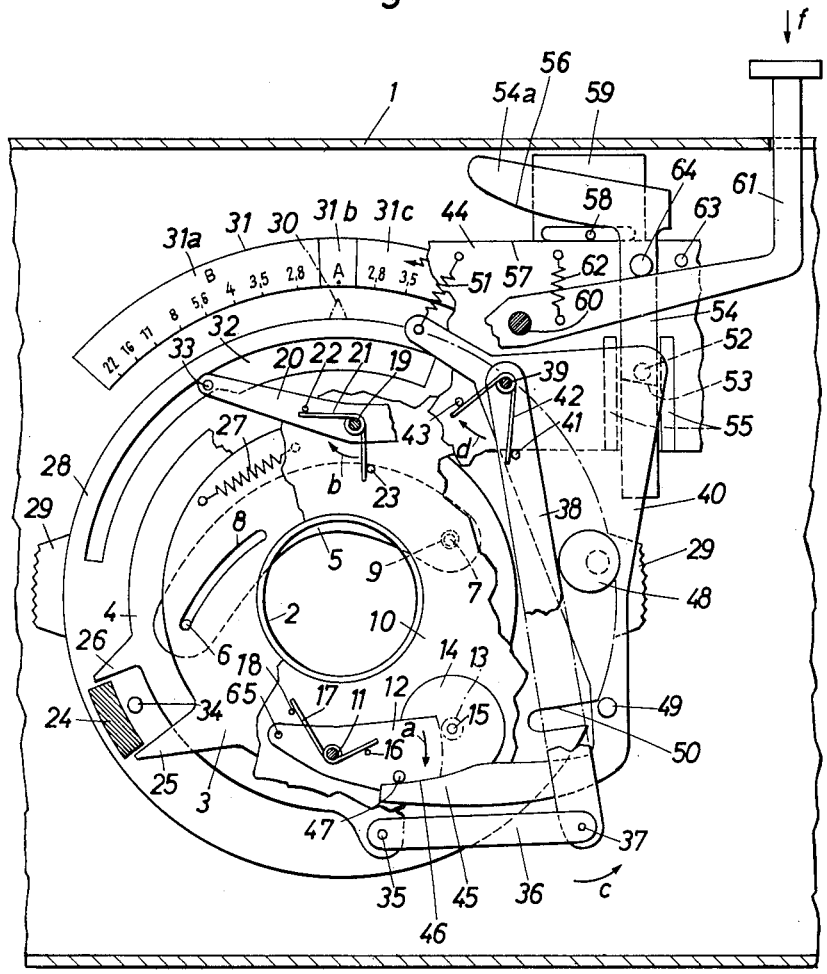
FIG. 1 is a fragmentary view of one possible embodiment of a structure according to the present invention, FIG. 1 being partly diagrammatic and showing the structure as it appears when seen from the rear.

Referring now to FIG. 1 of the drawings, the camera 1 illustrated therein includes a support means formed by a stationary inner objective tube 2. This stationary tube 2 supports for rotation a pair of diaphragm ring means 3 and 4 which are coaxial with respect to each other and which are supported by the tube 2 for rotary movement about the optical axis. As is apparent from FIG. 1, the diaphragm ring means 4 is located in front of the ring 3, and these rings 3 and 4, while free to turn about the optical axis, are prevented from shifting axially along the optical axis by any suitable collars or the like carried by the tube 2 and cooperating with the rings 3 and 4. These rings 3 and 4 define between themselves a space in which the diaphragm blades 5 are located, and for the sake of clarity only one of the blades 5 is illustrated in FIG. 1. The remaining blades are distributed about the optical axis and overlap each other in a well-known manner. Each diaphragm blade 5 carries a pair of pins 6 and 7, and the pin 6 of each blade 5 extends into an elongated slot 8 of the ring 3. The pin 7 of each blade 5 extends into a bore 9 of the ring 4. Thus, the several blades 5 of the diaphragm are respectively turnable about the pins 7 which are connected to the ring 4, while the several pins 6 of the several blades 5 are respectively movable along the slots 8, or during turning of the ring 3 these slots 8 move along the pins 6, respectively. The arrangement is such that when the ring 3 is stationary and the ring 4 turns in a clockwise direction, as viewed in FIG. 1, the several blades 5 will move so as to decrease the size of the exposure aperture, and when the ring 3 turns in a counterclockwise direction, as viewed in FIG. 1, with respect to the ring 4, the slots 8 will shift along the pins 6 so as to turn the blades 5 about the pins 7, which at this time are stationary, so that in this way also the size of the exposure aperture will be reduced.

Behind the diaphragm ring means 3 is located a stationary transverse wall 10 of the shutter housing, and this wall 10 is located in a plane which is perpendicular to the optical axis. The wall 10, which is formed with a central opening through which the tube 2 extends, fixedly carries a pivot pin 11 which serves to pivotally support a gear sector 12 which forms part of an exposure time controlling mechanism. The gear sector 12 meshes with a pin 13 which together with a flywheel 14 is supported for rotary movement by the shaft or pin 15 fixedly carried by the wall 10. A wire spring 17 is coiled about the pin 11, bears with one end against a pin 16 which is fixed to the sector 12 and bears with its opposite end against a stationary pin 18 carried by the wall 10, so that the spring 17 urges the sector 12 to turn in the direction of the arrow *a* shown in FIG. 1. The sector 12 carries a pin 65 which is located in the path of movement of a well-known shutter drive member which engages the pin 65 and turns the sector 12 in opposition to the spring 17 in a counterclockwise direction, as viewed in FIG. 1, so as to control the exposure time. The sector 12 is shown in FIG. 1 in the position where it will provide the longest exposure time. When the sector 12 is turned in a counerclockwise direction, as viewed in FIG. 1, so as to move the pin 65 downwardly, as viewed in FIG. 1, shorter exposure times are provided in a well-known manner.

The stationary plate or wall 10 carries also a pin or shaft 19 which serves to turnably support an elongated lever 20 which in a well-known manner is capable of being manually actuated by the operator for the purpose of manually maintaining the shutter open for a period of time which the operator himself determines. Thus, when the operator actuates the lever 20 the operator himself will determine the length of time of the particular exposure. This lever 20 carries a pin 22, and a wire spring 21 is coiled about the pin 19 and bears with one end against the pin 22 while an opposite end of the wire spring 21 bears against a stationary pin 23 carried by the plate 10, so that the spring 21 urges the lever 20 to turn in the direction of the arrow *b*, as shown in FIG. 1.

The plate 10 also fixedly carries a stop member 24 which extends forwardly from the plate 10 across the planes in which the rotary diaphragm ring means 3 and 4 are respectively located. Thus, the tube 2 and the plate 10 form support means for the stationary stop member 24. The pair of diaphragm ring means 3 and 4 respectively provided with projections 25 and 26 which in the initial positions of the rings 3 and 4, where the diaphragm is at its maximum opening, respectively engage opposite ends of the stationary stop member 24, as is shown in FIG. 1. A pair of spring means are operatively connected with the pair of diaphragm ring means 3 and 4 for respectively urging the latter to turn in clockwise and counterclockwise directions, respectively, as viewed in FIG. 1, so that the pair of spring means urge the projections 25 and 26 into engagement with the opposite ends of the stationary stop member 24. It will be noted that the pair of projections 25 and 26 of the pair of diaphragm ring means 3 and 4 define between themselves a gap in which is located a pin 34 as described below. The spring means which acts on the diaphragm ring means 3 is formed by an elongated spring 27 connected at one end to a stationary pin which is fixed to the plate 10 and at its opposite end to a pin which is carried by the ring 3. The spring means which cooperates with the rotary diaphragm ring means 4 acts on the ring 4 through several other elements, as will be apparent from the description which follows.

A manually turntable ring means 28 is supported for rotary movement about the optical axis by the support means which is formed by the tube 2, and the ring 28 is provided at a pair of diametrically opposed portions, for example, with projections 29 adapted to be engaged by the operator so as to facilitate turning of the ring 28. Of course, these projections 29 extend to the exterior so that they may be engaged by the operator for the purpose of manually turning the ring 28. The ring 28 carries an index 30 which is adapted to cooperate with a scale 31 having the three portions 31*a*, 31*b* and 31*c*. The central portion 31*b* of the scale 31 indicates the setting for automatic operation, while the portions 31*a* and 31*c* of the scale 31 are provided with conventional graduations indicating the size of the exposure aperture. Moreover, the portion 31*a* of the scale carries a symbol which indicates that this is the scale to use when the operator manually determines the exposure time, while the portion 31*c* of the scale carries a symbol which indicates that this is the portion of the scale to be used when operating with flash illumination.

The manually turnable ring means 28 is provided with a means for influencing the exposure time, and in the embodiment of FIG. 1 this means for influencing the exposure time takes the form of an elongated arcuate slot 32 which receives a pin 33 which is fixed to the lever 20, and the spring 21 urges the lever 20 to turn in that direction which maintains the pin 33 in engagement with the upper edge of the slot 32, as viewed in FIG. 1. It will be noted that the slot 32 has to the right of the pin 33, as viewed in FIG. 1, a width which is greater than the portion of the slot 32 to the left of the pin 33, as viewed in FIG. 1. When the wider portion of the slot 32 receives the pin 33 the operator may manually turn the lever 20 so as to manually determine the exposure time, while when the narrower part of the slot 32 receives the pin 33 the operator cannot turn the lever 20 and thus at this time the exposure time will not be manually determined. In this way, the portion of the ring means 28 which is formed with the slot 32 forms a means for influencing the exposure time. As was pointed out above, the pin 34 extends into the gap between the projections 25 and 26, this gap being formed when these projections respectively engage the opposite ends of the stop member 24, and this pin 34 is fixed to the manually turnable ring means 28 to turn therewith and forms a motion transmitting member which when the ring 28 is turned in a clockwise direction, as viewed in FIG. 1, will engage the projection 26 so as to turn the ring 4 in a clockwise direction, while when the ring 28 is manually turned in a counterclockwise direction, as viewed in FIG. 1, the motion transmitting pin 34 will engage the projection 25 so as to turn the ring 3 in a counterclockwise direction in opposition to the spring 27.

The structure of the invention includes an automatic means for automatically setting the camera, and this automatic means includes a link 36 which is pivotally connected at 35 to a part of the diaphragm ring means 4. The link 36 is pivotally connected by a pivot pin 37 to an elongated lever 38, and the parts 35–38 form a motion transmitting means for transmitting motion to the diaphragm ring means 4 so as to set the exposure aperture automatically in a manner described below. The lever 38 is turnably supported adjacent its upper end, as viewed in FIG. 1, on a stationary pivot pin 39 carried by a stationary part of the camera, and this pin 39 also serves to pivotally support a lever 40 which also forms part of the automatic means of the invention, this lever 40 forming a part of the structure for automatically determining the exposure time. The lever 38 carries a pin 41 which is engaged by one end of a wire spring 42 which is coiled about the spring 39 and which has its opposite end in engagement with a stationary pin 43 carried by a stationary intermediate wall 44 of the camera, and thus the spring 42 acts on the pin 41 so as to urge the lever 38 to turn in the direction of the arrow $c$ of FIG. 1. Of course, the turning of the lever 38 by the spring 42 in the direction of the arrow $c$ will result in movement of the link 36 to the right, as viewed in FIG. 1, with consequent counterclockwise turning of the ring 4, so that the spring 42 acts through the motion transmitting means 35–38 on the ring 4 to urge the projection 26 thereof into engagement with the stationary stop member 24, and thus the spring 42 forms the spring means which cooperates with the ring means 4 for urging the projection 26 thereof into engagement with the stationary stop member 24.

The exposure time lever 40 of the automatic means has at its lower end, as viewed in FIG. 1, an extension 45 provided with a camming edge 46 which cooperates with a pin 47 which is fixed to the gear sector 12. Thus, as the lever 40 turns in a clockwise direction about the pivot 39, as viewed in FIG. 1, the camming edge 46 will act on the pin 47 to turn the sector 12 in a counterclockwise direction about the pivot 11, and in this way the pin 65 will be shifted so as to regulate the exposure time in a manner described above. It will be noted that the spring 17 serves to maintain the pin 47 in engagement with the camming edge 46. The lever 40 carries a projection 48 against which the lever 38 is urged by the spring 42, so that this projection 48 serves to transmit the turning of the lever 40 in a clockwise direction, as viewed in FIG. 1, to the lever 38, and in this way when the lever 40 turns to regulate the exposure time the lever 38 also turns to act through the link 36 on the ring 4 to set the exposure aperture. The projection 48 is circular and is connected to the lever 40 for turning movement with respect to the latter about an axis which is eccentrically displaced from the axis of the circular portion is provided for releasably maintaining the projection 48 is eccentrically adjustable to adjust the angular position of the lever 38 with respect to the lever 40 when the lever 38 engages the projection 48. Any suitable means is provided for releasably maintaining the projection 48 in an adjusted angular position. Moreover, the exposure time determining lever 40 carries a pin 49 which forms a projection which is part of a mutually interacting blocking means, as will be apparent from the description below. Thus, in the position of the ring 28 shown in FIG. 1, an elongated cutout 50 which is formed in the ring 28 has its right open end, as viewed in FIG. 1, aligned with the pin 49, so that when the automatic means 38, 40 operates to automatically set the diaphragm and exposure time, the pin 49 will enter into the elongated cutout 50 and thus turning of the ring 28 manually will be prevented. It will be noted that the elongated cutout 50 extends generally along the path of movement of the projection 49 and is slightly wider than the latter. When the ring 28 is manually turned in one direction or the other from the rest position of the ring 28 shown in FIG. 1, the outer periphery of the ring 28 will engage the projection 49 so as to prevent automatic operation of the camera, and thus the portion of the ring 28 which is formed with a cutout 50 and the projection 49 carried by the lever 40 form a mutually interacting means for automatically preventing operation of the manually turnable ring 28 when the automatic means operates to automatically set the camera and for automatically preventing operation of the automatic means when the manually turnable ring 28 is turned in one direction or the other from the rest position thereof as shown in FIG. 1. It will be noted that this mutually interacting blocking means of the invention operates in a fully automatic manner and does not require the operator to set any elements in order to block the operation of the structure.

A spring 51 is connected at one end to the lever 40 and at its opposite end to a stationary pin which is carried by the wall 44, and this spring 51 urges the lever 40 to turn in the direction of the arrow $d$ shown in FIG. 1. In this way a pin 52 which is fixed to the lever 40 is maintained in engagement with a surface 53 formed by a shoulder of an elongated slide member 54 which is guided for longitudinal movement by guide elements 55 which are carried by the wall 44. At its upper end the slide member 54 has an extension 54a which at its lower edge is provided with a curved scanning edge 56. The wall 44 carries at its top end 57 an electrical instrument 59 which is a galvanometer, for example, and this instrument includes a rotor to which is connected a pointer 58 which turns with the rotor of the instrument in a well-known manner. The galvanometer 59 is electrically connected in a well-known manner either with a photocell or with a light-sensitive electrical resistor connected in circuit with a battery, so that in a manner well-known in the art the pointer 58 will assume angular positions indicative of the lighting conditions.

The stationary intermediate wall 44 of the camera fixedly carries a pin 60 which serves to pivotally support a manually operable lever 61 which is urged upwardly to the position shown in FIG. 1 by a spring 62 connected at one end to the lever 61 and at its opposite end to a stationary pin carried by the wall 44. A stationary pin 63 carried by the wall 44 limits the upward movement of the lever 61, and the lever 61 is adapted to be manually moved in the direction of the arrow $f$ of FIG. 1 by the operator in opposition to the spring 62. The slide member 54 carries a pin 64 which engages the upper edge of the lever 61 in the manner shown in FIG. 1. Thus, the spring 51 acts through the lever 40 on the pin 52 to cause the latter to engage the control surface 53 for urging the slide member 54 downwardly so as to maintain the pin 64 in engagement with the lever 61. The spring 62 is much stronger than the spring 51 so that when the operator releases the lever 61 the spring 62 will act in opposition to the spring 51 to locate the parts in the position shown in FIG. 1. In this position the scanning edge 56 is above the pointer 58 which is free to turn to an angular position determined by the lighting conditions. When the operator moves the lever 61 downwardly in opposition to the spring 62, the spring 51 will turn the lever 40 in a clockwise direction, as viewed in FIG. 1, and this will cause the pin 52 to act on the surface 53 so as to move the slide member 54 downwardly, and this movement will continue until the scanning edge 56 engages the pointer 58. Thus, depending upon the position of the pointer 58 the slide member 54 will move downwardly to a greater or lesser extent and in this way the extent of turning of the lever 40 will be determined by the lighting conditions. In the same way, since the motion transmitting member 48 acts on the lever 38 to turn the latter, the extent of turning of the lever 38, and thus the extent of turning of the diaphragm ring 4, will be determined by the lighting conditions. Of course, the turning of the lever 40 causes the camming edge 46 to act on the pin 47 to set the sector 12 at an angular position which will provide an exposure time according to the lighting conditions.

In the event that it is desired to set the camera of FIG. 1 automatically, the operator simply aligns the index 30 with the portion 31b of the scale 31 by turning the ring 28 until it has the position indicated in FIG. 1. Now the operator simply depresses the lever 61 so that the spring 51 can act in a manner described above for actuating the automatic means 38, 40 in order to automatically set the exposure time and exposure aperture in the manner described above. The ring 3 will remain stationary at this time so that the ring 4 turns with respect to the ring 3 in order to set the exposure aperture in the manner described above. The arrangement is such that the greater the amount of turning of the lever 40, the shorter will be the exposure time. Also, the arrangement is such that the greater the extent of turning of the ring 4 in a clockwise direction from the position shown in FIG. 1, the smaller will be the exposure aperture. During turning of the lever 40 the projection 49 is received in the cutout 50 so that operation of the ring 28 through inadvertence, for example, is reliably prevented. With the lever 61 depressed, the parts, when they have the position shown in FIG. 1, will thus operate automatically to set the exposure time and exposure aperture according to the lighting conditions, and after depression of the lever 61 a shutter release plunger may be actuated to trip the shutter so as to make the exposure. If desired, the lever itself may be designed to trip the shutter after the lever 61 has been turned through an angle larger than that required for full operation of the automatic structure.

Upon release of the lever 61, the spring 62 will return the parts to the position shown in FIG. 1, and of course the spring 42 will also participate in the return of the parts in the position of FIG. 1 since the spring 42 will act on the lever 38 to cause the latter to follow the projection 48 of the lever 40.

In the event that it is desired to make an exposure with flash illumination, the operator turns the ring 28 in a clockwise direction, as view in FIG. 1, so as to align the index 30 with a selected aperture value of the scale portion 31c. This turning of the ring 28 will cause the motion transmitting member 34 which is fixed to the ring 28 to turn with the latter in the gap between the projections 25 and 26, and the member 34 will engage the projection 26 so as to turn the ring 4 in a clockwise direction and thus the diaphragm will again be set by the ring 4, only in this case to a value determined by the manual turning of the ring 28 until the index 30 is aligned with a selected graduation of the scale portion 31c. During this manual turning of the ring 4, the ring 4 will act through the link 36 on the lever 38 to turn the latter in opposition to the spring 42 away from the member 48. Thus, it is possible to manually set the exposure aperture for flash operation, and at this time the exposure time remains unchanged at its largest value. Thus, with this latter exposure time and with a selected exposure aperture the operator can make a flash exposure. It will be noted that the turning of the ring 28 in a clockwise direction, as viewed in FIG. 1, causes the outer periphery of the ring 28 to cooperate with the projection 49 so as to prevent turning of the lever 40 even if the operator should inadvertently press the lever 61, and thus at this time the automatic structure is reliably prevented from operating. The cutout 50 of the ring 28 of course moves out of alignment with the projection 49 as soon as the operator turns the ring 28 from the position thereof shown in FIG. 1, this position being the rest position of the ring 28, and in this rest position of the ring 28 the automatic structure is of course operable.

In order to make an exposure with a manually determined exposure time, the ring 28 is turned in a counterclockwise direction, as viewed in FIG. 1, until the index 30 thereof is aligned with a selected aperture size of the scale portion 31a, and this turning of the ring 28 will cause the motion transmitting member 34 to engage the projection 25 so as to turn the ring 3 in opposition to the spring 27, and in this way the ring 3 will turn with respect to the now stationary ring 4 so as to reduce the size of the exposure aperture to the value selected by the operator on the scale 31a. During this turning of the ring 28 the wider portion of the arcuate slot 32 will receive the pin 33 so that the lever 20 can now be manually turned by the operator to open the shutter and maintain it open for whatever length of time the operator desires. After the shutter has been maintained open by manipulation of the lever 20 for the selected exposure time, the operator releases the lever 20 and the spring 21 acts on the lever 20 to turn the projection 33 back into engagement with the outer edge of the slot 32 so as to close the shutter in a well-known manner. It will be noted that at this time also the elongated cutout 50 is out of alignment with the projection 49 so that the periphery of the ring 28 cooperates with the projection 49 to prevent operation of the automatic structure. When the ring 28 is returned to its rest position shown in FIG. 1 the spring 27 will act on the ring 3 to return the latter to the position where its projection 25 engages the stop member 24, and thus the diaphragm will be returned to the position indicated in FIG. 1.

Figure 2:
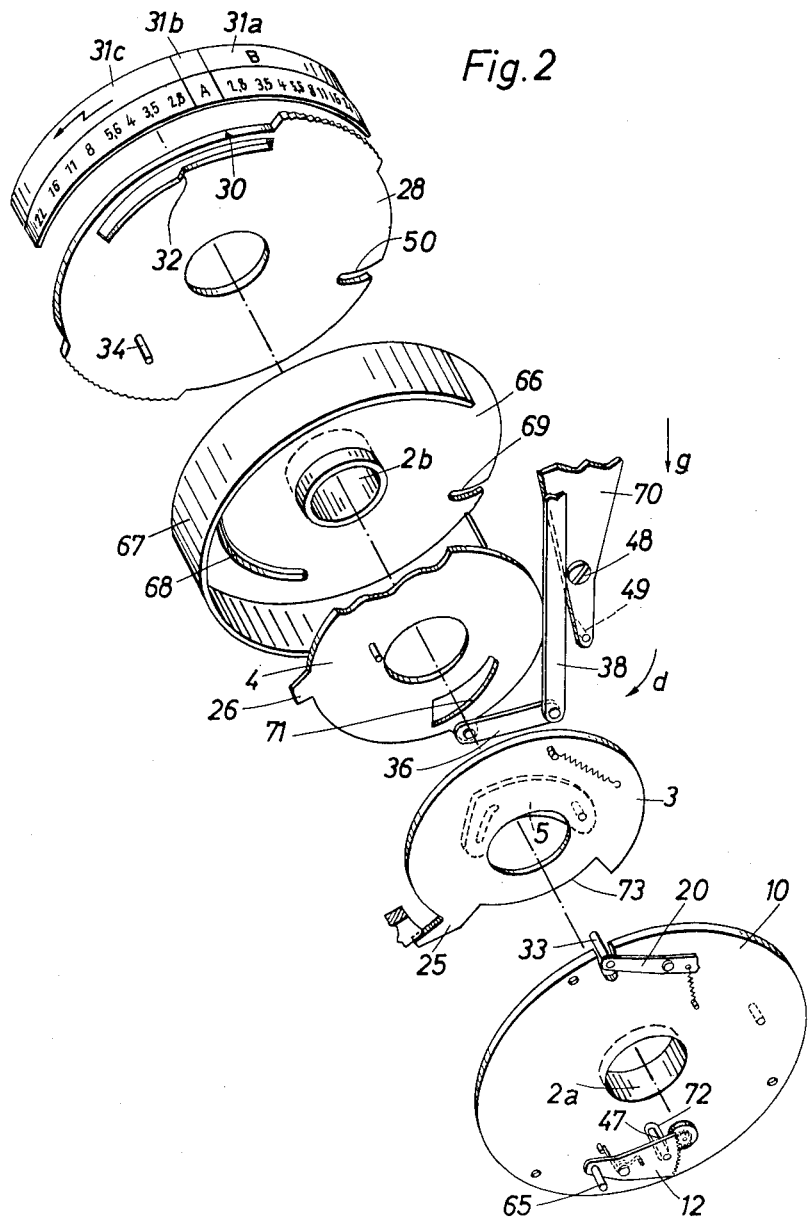
FIG. 2 is an exploded perspective view of another embodiment of a structure according to the present invention.

The embodiment of the invention which is illustrated in FIG. 2 differs from that of FIG. 1 with respect to the structure for controlling the exposure time. As may be seen from FIG. 2 the rear portion 2a of the inner tube 2 which forms part of the support means is connected with the stationary plate 10 of the shutter housing and also forms a bearing for the diaphragm ring means 3. The diaphragm ring means 4 is turnable carried by the forward portion 2b of the inner tube of the objective, and a front part of the tube 2b serves to turnably support the manually turnable ring means 28.

The front portion 2b of the tube 2 carries a stationary wall 66 which is provided with a rearwardly extending arcuate projection 67 which is fixed to the wall 10, so that the element 67, the walls 10 and 66 are fixed to each other. The intermediate plate 66 is formed with an arcuate slot 68 extending along an arc of a circle whose center is in the optical axis, and the motion transmitting pin 34 which is fixed to the plate 28 extends through the slot 68 so that the plate 66 does not interfere with rotary movement of the ring 28 throughout its entire range of movement. The motion transmitting member 34 extends into the gap between the projections 25 and 26 of the rings 3 and 4, respectively, these projections engaging the stationary stop member exactly in the manner described above, so that with the embodiment of FIG. 2 the turning of the ring 28 in one direction or the other will cause either the ring 3 or the ring 4 to turn so as to set the diaphragm. The intermediate plate 66 is also formed with an elongated cutout 69 which is exactly the same as the cutout 50 and which is aligned with the cutout 50 when the index 30 is aligned with the portion 31b of the scale 31, and in this way the projecting pin 49 can enter into both of the cutouts 50 and 69 during automatic operation of the camera of FIG. 2. The projection 49 is carried in the embodiment of FIG. 2 by a lever 70 which corresponds in all respects to the lever 40 described above except that the lever 70 does not carry any projection for cooperating with the gear sector 12. The lever 70 is however pivotally supported together with the lever 38 in exactly the manner described above in connection with FIG. 1 for the lever 40 and also the same automatic structure operates to automatically turn the lever 70 and the lever 38. It will be noted that the lever 38 is connected by a link 36 with the ring 4, in exactly the manner described above, and of course lever 38 has a turning axis which coincides with that of the lever 70, and the lever 70 carries the projection 48 which transmits turning of the lever 70 in a clockwise direction, as viewed in FIG. 2, to the lever 38.

The diaphragm ring means 4 of FIG. 2 differs from the diaphragm ring means 4 of FIG. 1 in that the diaphragm ring means 4 of FIG. 2 is provided with an exposure time control means, this latter means being formed by a part of the ring 4 which is formed with the cutout 71 having an outer curved camming edge which has a well-known configuration for determining the exposure time. This camming edge is engaged by the pin 47 which is carried by the sector 12, and the spring which acts on the sector 12 maintains the pin 47 in engagement with the camming edge of the ring 4 which determines the exposure time. The plate 10 is formed with an arcuate slot 72 through which the pin 47 freely extends, and the ring 3 is formed with a cutout 73 through which the pin 47 also extends, so that the pin 47 extends freely through the rings 10 and 3 into the cutout of the ring 4 which is provided with the exposure time controlling camming edge. All of the other components of the embodiment of FIG. 2 correspond to those of FIG. 1 and operate in the same way. However, it will be noted that the portions 31a and 31c of the scale 31 are reversed in FIG. 2 as compared with FIG. 1, and, of course, in order to cooperate properly with this scale the elongated slot 32 is also reversed in FIG. 2, as compared with FIG. 1, so that the wider portion of the slot 32 is located at the left in FIG. 2.

In order to permit the structure of FIG. 2 to automatically set the camera the index 30 is aligned with the portion 31b of the scale 31 and now the manually operable release member 61, which is not shown in FIG. 2, is depressed in the direction of the arrow g of FIG. 2 so as to release the lever 70 to the spring 51, which is not shown in FIG. 2, and the scanning edge 56 will cooperate with the pointer 58 to determine the extent of turning of the levers 38 and 70 all in the manner described above in connection with FIG. 1. The result is that the lever 70 turns in the direction of the arrow d of FIG. 2 to an angular position as determined by the lighting conditions, and of course the motion transmitting projection 48 acts on the lever 38 to turn the latter through an angle which is also determined by the lighting conditions. The connection of the lever 38 through the link 36 with the ring 4 will turn the latter with respect to the ring 3, which now remains stationary, so as to set the diaphragm blades 5 to provide an exposure aperture determined by the lighting conditions, and at the same time the outer camming edge of the cutout 71 of the ring 4 acts on the pin 47 to turn the sector 12 so as to also set the exposure aperture in accordance with the lighting conditions. Thus, with the embodiment of FIG. 2 after the release member 61 is pressed the shutter may be tripped to make an exposure.

As was the case with the embodiment of FIG. 1, the embodiment of FIG. 2 is also manually operable for the purpose of making exposures with flash illumination or for the purpose of making exposures with manually determined exposure times. In order to make an exposure with flash illumination, the ring 28 is turned in a counterclockwise direction, as viewed in FIG. 2, so as to align the index 30 with a selected graduation of the scale 31c, and the result is that the motion transmitting member 34 will engage the projection 25 to turn the ring 3 with respect to the ring 4 so that with the embodiment of FIG. 2, it is the ring 3 which turns with respect to the ring 4 to set the diaphragm when making an exposure with flash illumination. Simultaneously with the turning of the ring 28 to locate the index 30 in alignment with a selected graduation of the scale portion 31c, the cutout 50 moves out of alignment with the projection 49 so that the automatic structure is blocked. It will also be noted that at this time the narrower portion of the cutout 32 will receive the unillustrated pin 33 of the unillustrated lever 20, so that at this time the lever 20 is blocked against manual operation, and in this way the cutout 32 of the ring 28 also serves as a means for influencing the exposure time. It will be noted that since the ring 3 turns in order to set the diaphragm when making an exposure with flash illumination with the embodiment of FIG. 2, the ring 4 remains stationary and thus the cutout 71 remains stationary so that the exposure time remains unchanged. After making one or more flash exposures it is only necessary to turn the ring 28 to align the index 30 with the portion 31b of the scale so as to again place the structure in a condition where automatic setting of the camera can take place.

In order to provide an exposure with a manually determined exposure time, the ring 28 is turned in a clockwise direction, as viewed in FIG. 2, so as to locate the index 30 in alignment with a selected graduation of the scale portion 31a, and in this way the wider portion of the slot 32 will receive the pin 33 of the lever 20 so that this lever 20 can now be turned for manually determining the exposure time. The turning of the ring 28 in a clockwise direction at this time will cause the motion transmitting member 34 to engage the projection 26 for turning the ring 4 so as to set the diaphragm. Of course, the turning of the ring 4 at this time will cause the cutout 71 to shift with respect to the pin 47 so that the latter pin will move to change the position of the gear sector 12. However, this latter adjustment will have no influence on the exposure since manually determined exposure times are generally greater than one second and the pin 47 cooperates with the camming edge of the cutout 71 and the sector 12 to set the camera for exposures times in the range of from approximately $\frac{1}{30}$ to $\frac{1}{500}$ sec. Thus, the manual determination of the exposure time will always be greater than that for which the gear sector 12 is set, so that the shutter will always be manually maintained open for a length of time longer than that which would be provided by the position of the gear sector 12, and thus the adjustment of the gear sector 12 at this time is of no consequence.

Figure 3:
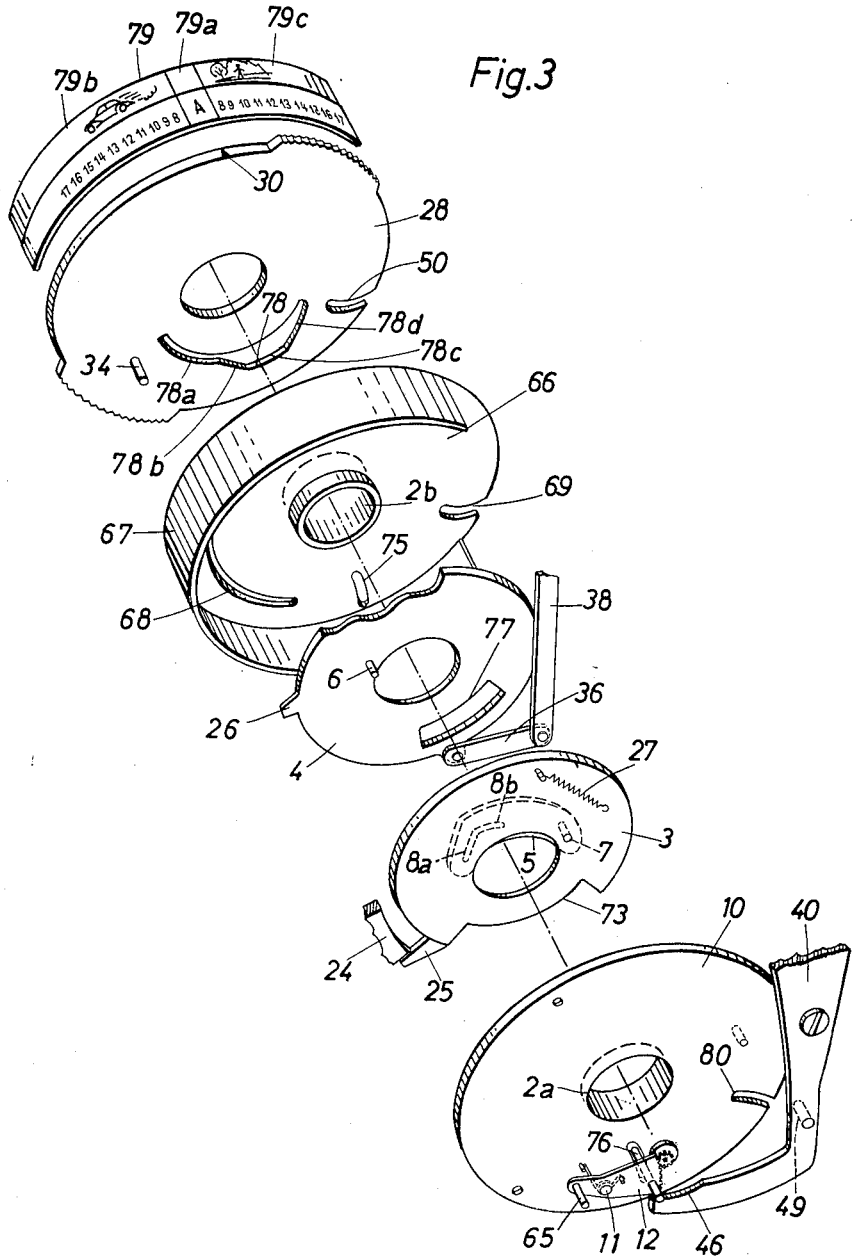
FIG. 3 is an exploded perspective view of a third embodiment of a structure according to the present invention.

The embodiment of the invention which is illustrated in FIG. 3 differs from the above described embodiments in that in addition to providing for automatic setting of the camera, there are manual settings where both the exposure aperture and the exposure time will be set. Moreover, with the manual settings of the embodiment of FIG. 3 the operator has a choice of combinations of exposure time and exposure aperture according to whether the subject being photographed is rapidly moving or is one which requires the greatest possible depth of field.

Referring to FIG. 3, the rear portion 2a of the tube of the objective again carries the stationary plate 10 of the shutter housing and the plate 10 turnable carries the gear sector 12 of the mechanism for determining the exposure time. The diaphragm ring 3 is also turnably supported by the tubular portion 2a. The diaphragm ring 4 is turnably supported by the forward portion 2b of the inner tube of the objective, and the tube 2b is fixed with an intermediate plate 66 which is fixed by the arcuate portion 67 with the plate 10, as was described above in connection with FIG. 2. Also, in the manner described above in connection with FIG. 2, the plate 66 is formed with an arcuate slot 68 and with an elongated cutout 69, and in addition the plate 66 of FIG 3 is formed with a slot 75 through which the pin 76 to the gear sector 12 is adapted to pass. This pin 76 controls the angular position of the gear sector 12 so as to control the exposure time, and this pin 76 extends freely through an arcuate slot of the plate 10 identical with the slot 72 of FIG. 2, as well as through the cutout 73 of the ring 3. The ring 4 is formed with a cutout 77 through which the pin 76 freely passes and finally the pin 76 passes through the slot 75 which may be identical with and which is aligned with the slot of the plate 10 through which the pin 76 passes. In this way the pin 76 has access to the exposure time controlling edge of a cutout which is formed in the manually turnable ring 28 which is turnably supported by the part of the tube 2b which extends forwardly beyond the plate 66. The cutout which is formed in the ring 28 has a lower camming edge which is engaged by the pin 76 so as to control the angular position of the gear sector 12, and this camming edge has a pair of regions each of which has two sections for determining the position of the pin 76. One of these regions includes the sections 78a and 78b, while the other of these regions includes the sections 78c and 78d. The sections 78a and 78c of the camming edge respectively extend along arcs of concentric circles whose common center is in the optical axis so that when the ring 28 is turned with the pin 76 in engagement with the section 78a or the section 78c the sector 12 will not turn and the exposure time will remain unchanged. The sections 78b and 78d of the camming edge 78 are, however, inclined with respect to the sections 78a and 78c so that when the ring 28 is turned to angular positions where the sections 78b or 78d engage the pin 76, the exposure time will be changed.

The manually turnable ring 28 carries the index 30 which cooperates with the scale 79. The scale 79 has the intermediate portion 79a which includes a symbol to indicate that when the index 30 is aligned with the portion 79a of the scale 79 the apparatus is set for automatic operation. In addition, the scale 79 includes portions 79b and 79c which are provided with light value graduations according to the selected combination of exposure apertures and exposure times.

In order to transmit rotary movement of the ring 28 to the diaphragm ring means 3 or 4, the ring 28 again carries the motion transmitting member 34 which passes through the arcuate slot 68 of the plate 66 into the gap between the projections 25 and 26 which in the initial position of the rings 3 and 4 engage the opposite ends of the stationary stop member 24, as described above. Spring means as described above cooperate, respectively, with the rings 3 and 4 to urge the projections 25 and 26 toward the stop member 24, this stop member being fixedly carried by the plate 10 as also described above. Thus, the ends of the stop member 24 determine the spacing between the projections 25 and 26 in the initial position of the rings 3 and 4, and the length of the stop member 24 is such that this length is a little longer than the length of the section 78b of the camming edge 78. Thus, while turning the motion transmitting member 34 in the gap between the projections 25 and 26 when the latter engage the opposite ends of the stop member 24, the exposure time will be set by cooperation of the camming edge portion 78b with the pin 76, and the exposure aperture will remain unchanged. Of course, this result is brought about not only by giving the section 78b an angular length equal to the angular length of the stop member 24, but also by angular positioning the motion transmitting member 34 with respect to the edge portion 78b in such a way that when the member 34 is turned in the gap between the projections 25 and 26 the entire edge portion 78b will be capable of moving with respect to the pin 76 before the motion transmitting member 34 engages either of the projections 25 or 26.

In the embodiment of FIG. 3 the ring 4 is capable of being automatically turned by the lever 38 and link 36 in exactly the manner described above in connection with FIG. 1, and also, as was the case with FIG. 1, the identical lever 40 in provided at its lower arm with the camming edge 46 which in this case cooperates with the pin 76 for controlling the exposure time in exactly the same way as was described above in connection with FIG. 1. Also, the lever 40 carries the blocking pin 49 which moves along a cutout 80 formed in the plate 10 as well as along the cutout 69 formed in the plate 66, and of course this member 49 will move along the cutout 50 of the ring 28 when the index 30 thereof is aligned with the portion 79a of the scale 79.

The parts are so arranged in the embodiment of FIG. 3 that when the ring 28 is in its rest position where the index 30 is aligned with the portion 79a of the scale 79, the rings 3 and 4 with their projections 25 and 26 engaging the stop member 24 provide the largest exposure aperture and moreover the longest exposure time, of 1/30 sec., for example, is provided. Between the rings 3 and 4 are located the blades 5 of the diaphragm, and only one blade 5 is shown for the sake of clarity, this blade being provided in the embodiment of FIG. 3 with a slot having the portions 8a and 8b. Thus, instead of the slots being formed in the ring 3, as was the case with FIG. 1, the slots are formed in the diaphragm blades themselves and each blade 5 has slots 8a, 8b as indicated in FIG. 3. It will be noted that the embodiment of FIG. 2 includes the same type of diaphragm arrangement as that shown in FIG. 3. The pins 6 which are carried by the ring 4 respectively extend into the slots 8a, 8b of the several blades 5, and these blades are pivotally connected to the ring 3 by the several pins 7. The curvature of the slot portions 8a and 8b is such that as long as the pin 6 is in the slot portion 8a of a diaphragm blade turning of the diaphragm blade with respect to the pivot 7 will be provided, while when the pin 6 is in the slot portion 8b of a diaphragm blade the turning of the rings 3 and 4 one with respect to the other will produce no turning of the diaphragm blade and thus as long as the portion 8b of each of the slots of the diaphragm blades receives a pin 6 the diaphragm aperture will remain unchanged during relative turning of the rings 3 and 4 one with respect to the other. The length of the slot portions 8a and 8b respectively corresponds to the length of the camming edge portions 78c and 78d of the exposure time controlling edge 78.

With respect to automatic setting of the camera, the embodiment of FIG. 3 is identical with that of FIG. 1. The member 61 which is not shown in FIG. 3 is depressed so as to release the automatic structure for operation to automatically set the camera according to the lighting conditions. Thus, when the camera is automatically operated the lever 38 will turn to act through the link 36 on the ring 4 to turn the latter with respect to the ring 3 so as to set the exposure aperture, and in the same way the lever 40 will turn to cause the camming edge 46 to cooperate with the pin 76 so as to turn the sector 12 and thus set the exposure time. Of course, at this time the pin 49 will move along the cutout 50 so as to prevent manual turning of the ring 28.

The springs which were described above in connection with FIG. 1 will operate upon release of the lever 61 to return the parts shown in FIG. 3 to their rest positions. The arrangement is such that the exposure time and the exposure aperture are both simultaneously adjusted, as was the case for the embodiment of FIG. 1.

In the event that it is desired to make an exposure where a rapidly moving subject is involved or where a great depth of field is desired, then the ring 28 may be manually turned for this purpose.

In order to photograph a rapidly moving subject the light intensity is first determined from a light meter which is carried by and built into the camera, for example, and from the reading on the light meter it is determined which graduation of the scale 79b should be selected. This scale 79b carries a symbol which indicates that this is the scale which is used for a rapidly moving subject. With the selected light value known, the operator turns the ring 28 so as to place the index 30 in alignment with the selected light value. The initial turning of the ring 28 will result after a short displacement in adjusting of the exposure time since the edge portion 78b will first move with respect to the pin 76 to set the exposure time and the diaphragm is not actuated at this time since the motion transmitting member 34 turns freely at this time in the gap between the projections 25 and 26 and has not yet reached the projection 25. In the event that the light intensity is so great that when the smallest exposure time is reached it is also necessary to reduce the size of the exposure aperture, then the portion 78b of the camming edge 78 will move beyond the pin 76 and the portion 78a will move into engagement with the pin 76 so that now during the continued turning of the ring 28 in a counterclockwise direction, as viewed in FIG. 3, the exposure time will remain at its smallest value while the continued turning of the ring 28 will cause the motion transmitting member 34 to engage the projection 25 and turn the ring 3 for reducing the size of the exposure aperture, and thus at this time the combination of the smallest possible exposure time with the proper aperture will be provided. Once the index 30 has been aligned with the selected aperture size of the scale 79b, the operator can trip the shutter with purely conventional structure and make the exposure. Thereafter, additional manual setting of the camera may be provided for further exposures or the index 30 may be realigned with the portion 79a so as to make automatic exposures.

In the event that it is desired to make an exposure where a great depth of field is required, then when obtaining from the light meter the light value the index 30 is aligned with the selected light value on the scale 79c. Thus, the ring 28 will now be turned in a clockwise direction, as viewed in FIG. 3, and during this turning the portion 78c of the edge 78 will cooperate with the pin 76 during the initial part of the turning and thus the exposure time will remain unchanged. However, the motion transmitting member 34 will, after a short displacement, engage the projection 26 to turn the ring 4 and thus the pins 6 will turn along the portions 8a of the several slots of the diaphragm blades and will reduce the size of the diaphragm during the initial part of the turning of the rings 28. Where the light intensity is so great that in addition to the smallest aperture less than the maximum exposure time is required, the ring 28 will continue to turn until the portion 78d of the edge 78 will engage the pin 76 and will thus reduce the exposure time. At this time, which is to say while the edge portion 78d engages the pin 76, the pins 6 ride along the slot portions 8b of the several diaphragm blades 5, so that at this time there is no change in the size of the diaphragm while the exposure time is reduced.

It will be noted that with the embodiment of FIG. 3 in all angular positions of the manually turnable ring 28 except that position which is indicated for automatic operation, the cutout 50 is out of line with the projection 49 and thus the periphery of the ring 28 will cooperate with the projection 49 to prevent actuation of the automatic structure.

Instead of the above-described scale of FIG. 3 for determining the position of the manually turnable ring 28, this ring can, in a known way, be operatively connected with the scanning member which cooperates with the galvanometer pointer of the light-sensing structure.

Of course, variations of the above-described structure are possible within the scope of the invention. Thus, instead of the two different types of manually selectable combinations of exposure time and exposure aperture shown in FIG. 3, it is possible to provide the scale with a portion suitable for use with flash illumination, as is the case with FIGS. 1 and 2. Furthermore, it is possible when using the automatic structure for automatically setting the camera to also provide combinations of exposure time and exposure aperture which can be selected either according to whether a rapidly moving subject is to be photographed or whether the greatest depth of field is desired.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; and means operatively connected to said manually turnable ring means for turning movement therewith for influencing the exposure time according to the direction of turning of said manually turnable ring means.

2. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; and means for automatically determining the exposure aperture and exposure time according to the lighting conditions, said manually turnable ring means cooperating with said means for automatically determining the exposure time and exposure aperture to prevent operation of the latter except when said manually turnable ring means is in said rest position thereof.

3. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; a stationary stop member carried by said support means and engaged by both of said diaphragm ring means when said manually turnable means is in said rest position thereof; and a pair of spring means respectively cooperating with said pair of diaphragm ring means for yieldably maintaining the latter in engagement with and urging the same towards said stop member.

4. In a camera, in combination, support means; a pair of diaphragm ring means each supported for rotary movement about the optical axis and each changing the exposure aperture when turning with respect to the other diaphragm ring means; and manually operable means movable in one direction for moving one of said diaphragm ring means and movable in an opposite direction for moving the other of said diaphragm ring means, said manually operable means influencing the exposure time according to the direction of movement thereof.

5. In a camera, in combination, support means; first diaphragm ring means supported by said support means for rotary movement about the optical axis and changing the size of the exposure aperture during rotary movement about the optical axis, said first ring means having a projection; a stationary stop member carried by said support means and having one end engaged by said projection when said diaphragm ring means is in an initial position; spring means cooperating with said first diaphragm ring means for urging the latter to turn in that direction which will urge said projection toward said end of said stop member; second diaphragm ring means coaxial with said first ring means and also supported for rotary movement about the optical axis by said support means, said second ring means also changing the exposure aperture during turning about the optical axis and said second ring means having a projection engaging an opposite end of said stop member when said second ring means is in an initial position thereof, said projections when respectively engaging said ends of said stop member defining a gap between themselves; second spring means operatively connected to said second diaphragm ring means for urging the latter to turn in that direction which moves said projection of said second ring means toward said other end of said stop member; manually turnable ring means also supported for rotary movement about the optical axis by said support means; and motion transmitting means fixed to said manually turnable ring means for rotary movement therewith and located in said gap between said projections when said manually turnable ring means is in a rest position thereof, whereby when said manually turnable ring means is turned by the operator in one direction said motion transmitting means will engage one of said projections to turn one of the diaphragm ring means in one direction while when said manually turnable ring means is turned in an opposite direction said motion transmitting means will engage the other of said projections to turn the other of said ring means in an opposite direction.

6. In a camera, in combination, support means; first diaphragm ring means supported by said support means for rotary movement about the optical axis and changing the size of the exposure aperture during rotary movement about the optical axis, said first ring means having a projection; a stationary stop member carried by said support means and having one end engaged by said projection when said diaphragm ring means is in an initial position; spring means cooperating with said first diaphragm ring means for urging the latter to turn in that direction which will urge said projection toward said end of said stop member; second diaphragm ring means coaxial with said first ring means and also supported for rotary movement about the optical axis by said support means, said second ring means also changing the exposure aperture during turning about the optical axis and said second ring means having a projection engaging an opposite end of said stop member when said second ring means is in an initial position thereof, said projections when respectively engaging said ends of said stop member defining a gap between themselves; second spring means operatively connected to said second diaphragm ring means for urging the latter to turn in that direction which moves said projection of said second ring means toward said other end of said stop member; manually turnable ring means also supported for rotary movement about the optical axis by said support means; motion transmitting means fixed to said manually turnable ring means for rotary movement therewith and located in said gap between said projections when said manually turnable ring means is in a rest position thereof, whereby when said manually turnable ring means is turned by the operator in one direction said motion transmitting means will engage one of said projections to turn one of the diaphragm ring means in one direction while when said manually turnable ring means is turned in an opposite direction said motion transmitting means will engage the other of said projections to turn the other of said ring means in an opposite direction; and exposure time influencing means carried by said manually turnable ring means for rotary movement therewith.

7. In a camera, in combination, support means; first diaphragm ring means supported by said support means for rotary movement about the optical axis and changing the size of the exposure aperture during rotary movement about the optical axis, said first ring means having a projection; a stationary stop member carried by said support means and having one end engaged by said projection when said diaphragm ring means is in an initial position; spring means cooperating with said first diaphragm ring means for urging the latter to turn in that direction which will urge said projection toward said end of said stop member; second diaphragm ring means coaxial with said first ring means and also supported for rotary movement about the optical axis by said support means, said second ring means also changing the exposure aperture during turning about the optical axis and said second ring means having a projection engaging an opposite end of said stop member when said second ring means is in an initial position thereof, said projections when respectively engaging said ends of said stop member defining a gap between themselves; second spring means operatively connected to said second diaphragm ring means for urging the latter to turn in that direction which moves said projection of said second ring means toward said other end of said stop member; manually turnable ring means also supported for rotary movement about the optical axis by said support means; motion transmitting means fixed to said manually turnable ring means for rotary movement therewith and located in said gap between said projections when said manually turnable ring means is in a rest position thereof, whereby when said manually turnable ring means is turned by the operator in one direction said motion transmitting means will engage one of said projections to turn one of the diaphragm ring means in one direction while when said manually turnable ring means is turned in an opposite direction said motion transmitting means will engage the other of said projections to turn the other of said ring means in an opposite direction; and exposure time influencing means carried by said manually turnable ring means for rotary movement therewith, said exposure time influencing means being formed by a portion of said manually turnable ring means which is formed with a cutout of a configuration which will influence the exposure time differently depending upon the direction of turning of said manually operable ring means.

8. In a camera, in combination, support means; first diaphragm ring means supported by said support means for rotary movement about the optical axis and changing the size of the exposure aperture during rotary movement about the optical axis, said first ring means having a projection; a stationary stop member carried by said support means and having one end engaged by said projection when said diaphragm ring means is in an initial position; spring means cooperating with said first diaphragm ring means for urging the latter to turn in that direction which will urge said projection toward said end of said stop member; second diaphragm ring means coaxial with said first ring means and also supported for rotary movement about the optical axis by said support means, said second ring means also changing the exposure aperture during turning about the optical axis and said second ring means having a projection engaging an opposite end of said stop member when said second ring means is in an initial position thereof, said projections when respectively engaging said ends of said stop member defining a gap between themselves; second spring means operatively connected to said second diaphragm ring means for urging the latter to turn in that direction which moves said projection of said second ring means toward said other end of said stop member; manually turnable ring means also supported for rotary movement about the optical axis of said support means; motion transmitting means fixed to said manually turnable ring means for rotary movement therewith and located in said gap between said projections when said manually turnable ring means is in a rest position thereof, whereby when said manually turnable ring means is turned by the operator in one direction said motion transmitting means will engage one of said projections to turn one of the diaphragm ring means in one direction while when said manually turnable ring means is turned in an opposite direction said motion transmitting means will engage the other of said projections to turn the other of said ring means in an opposite direction; exposure time influencing means carried by said manually turnable ring means for rotary movement therewith, said exposure time influencing means being formed by a portion of said manually turnable ring means which is formed with a cutout of a configuration which will influence the exposure time differently depending upon the direction of turning of said manually operable ring means; and manually operable means accessible to the operator for manually determining the exposure time during exposure according to the will of the operator, said cutout of said manually turnable means cooperating with said manually operable means for determining the exposure time to prevent operation of the latter when said manually turnable ring means is turned in one direction by the operator and to release said exposure time determining means for operation when said manually operable ring means is turned by the operator in an opposite direction.

9. In a camera, in combination, support means; first diaphragm ring means supported by said support means for rotary movement about the optical axis and changing the size of the exposure aperture during rotary movement about the optical axis, said first ring means having a projection; a stationary stop member carried by said support means and having one end engaged by said projection when said diaphragm ring means is in an initial position; spring means cooperating with said first diaphragm ring means for urging the latter to turn in that direction which will urge said projection toward said end of said stop member; second diaphragm ring means coaxial with said first ring means and also supported for rotary movement about the optical axis of said support means, said second ring means also changing the exposure aperture during turning about the optical axis and said second ring means having a projection engaging an opposite end of said stop member when said second ring means is in an initial position thereof, said projections when respectively engaging said ends of said stop member defining a gap between themselves; second spring means operatively connected to said second diaphragm ring means for urging the latter to turn in that direction which moves said projection of said second ring means toward said other end of said stop member; manually turnable ring means also supported for rotary movement about the optical axis by said support means; motion transmitting means fixed to said manually turnable ring means for rotary movement therewith and located in said gap between said projections when said manually turnable ring means is in a rest position thereof, whereby when said manually turnable ring means is turned by the operator in one direction said motion transmitting means will engage one of said projections to turn one of the diaphragm ring means in one direction while when said manually turnable ring means is turned in an opposite direction said motion transmitting means will engage the other of said projections to turn the other of said ring means in an opposite direction; and exposure time influencing means carried by said manually turnable ring means for rotary movement therewith, said exposure time influencing means being formed by a portion of said manually turnable ring means which is formed with a cutout of a configuration which will influence the exposure time differently depending upon the direction of turning of said manually turnable ring means, said cutout having a configuration which will provide the combination of the shortest exposure time with the largest exposure aperture when said manually turnable ring means is turned in one direction and the longest exposure time with the smallest exposure aperture when said manually turnable ring means is turned in the opposite direction.

10. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; and exposure time control means carried by one of said diaphragm ring means for turning movement therewith.

11. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; exposure time control means carried by one of said diaphragm ring means for turning movement therewith; and automatic means for determining the exposure aperture and exposure time according to the lighting conditions, said manually operable ring means cooperating with said automatic means to prevent operation of the latter except when said manually turnable ring means is in said test position thereof, and said automatic means being operatively connected to said one diaphragm ring means to turn the latter in order to determine the exposure aperture when said manually turnable ring means is in said rest position thereof, said exposure time control means turning with said one diaphragm ring means to simultaneously determine the exposure time.

12. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; automatic exposure time setting means for automatically setting the exposure time according to the lighting conditions when said manually turnable ring means is in said rest position thereof; and motion transmitting means cooperating with said automatic exposure time setting means and with one of said diaphragm ring means for turning said one ring means when said automatic means operates to set the exposure time, so that said motion transmitting means will act on said one ring means to automatically set the exposure aperture simultaneously with the setting of the exposure time.

13. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; automatic exposure time setting means for automatically setting the exposure time according to the lighting conditions when said manually turnable ring means is in said rest position thereof; and motion transmitting means cooperating with said automatic exposure time setting means and with one of said diaphragm ring means for turning said one ring means when said automatic means operates to set the exposure time, so that said motion transmitting means will act on said one ring means to automatically set the exposure aperture simultaneously with the setting of the exposure time, said automatic exposure time setting means and said motion transmitting means respectively including a pair of levers turnable about a common axis and the lever which forms part of said exposure time setting means carrying a projection; spring means cooperating with the lever which forms part of said motion transmitting means for maintaining the latter lever in engagement with said projection so that when said level of said exposure time setting means turns said projection thereof engages the lever of said motion transmitting means to move the latter lever; and scanning means for scanning the position of an element which indicates the lighting conditions, said scanning means cooperating with said automatic exposure time setting means for determining the degree of movement thereof in accordance with the lighting conditions.

14. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; automatic means for automatically setting the exposure time and exposure aperture; and mutually interacting blocking means cooperating with said automatic means and said manually turnable ring means for preventing turning of said manually turnable ring means when said automatic means operates and for preventing operation of said automatic means when said manually turnable ring means has been turned from said rest position thereof.

15. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; automatic means for automatically setting the exposure time and exposure aperture; and mutually interacting blocking means cooperating with said automatic means and said manually turnable ring means for preventing turning of said manually turnable ring means when said automatic means operates and for preventing operation of said automatic means when said manually turnable ring means has been turned from said rest position thereof, said mutually interacting blocking means including a projection carried by said automatic means for movement along a predetermined path during operation of said automatic means and a portion of said manually turnable ring means which is formed with a cutout into which said projection can freely move only when said manually turnable ring means is in said rest position thereof.

16. In a camera, in combination, support means; a pair of coaxial diaphragm ring means supported by said support means for rotary movement about the optical axis and each diaphragm ring means changing the exposure aperture when it turns with respect to the other diaphragm ring means; manually turnable ring means also supported by said support means for rotary movement about the optical axis and turnable in opposed directions from a predetermined rest position, said manually turnable ring means turning one of said diaphragm ring means when said manually turnable ring means turns in one direction from said rest position thereof and said manually turnable ring means turning the other of said diaphragm ring means when said manually turnable ring means turns in the other direction from said rest position thereof; means operatively connected to said manually turnable ring means for turning movement therewith for influencing the exposure time according to the direction of turning of said manually turnable ring means; automatic means for automatically setting the exposure time and exposure aperture; and mutually interacting blocking means cooperating with said automatic means and said manually turnable ring means for preventing turning of said manually turnable ring means when said automatic means operates and for preventing operation of said automatic means when said manually turnable ring means has been turned from said rest position thereof, said mutually interacting blocking means including a projection carried by said automatic means for movement along a predetermined path during operation of said automatic means and a portion of said manually turnable ring means which is formed with a cutout into which said projection can freely move only when said manually turnable ring means is in said rest position thereof, said cutout extending along the path of movement of said projection and having a width only slightly larger than said projection.

References Cited in the file of this patent

UNITED STATES PATENTS

| | | |
|---|---|---|
| 2,868,095 | Gebele | Jan. 13, 1959 |
| 2,955,519 | Sommer | Oct. 11, 1960 |
| 2,993,425 | Rentschler | July 25, 1961 |